H. P. LAROUETTE.
SAFETY STEERING ATTACHMENT FOR AUTOMOBILES.
APPLICATION FILED JULY 3, 1908.
929,605.
Patented July 27, 1909.
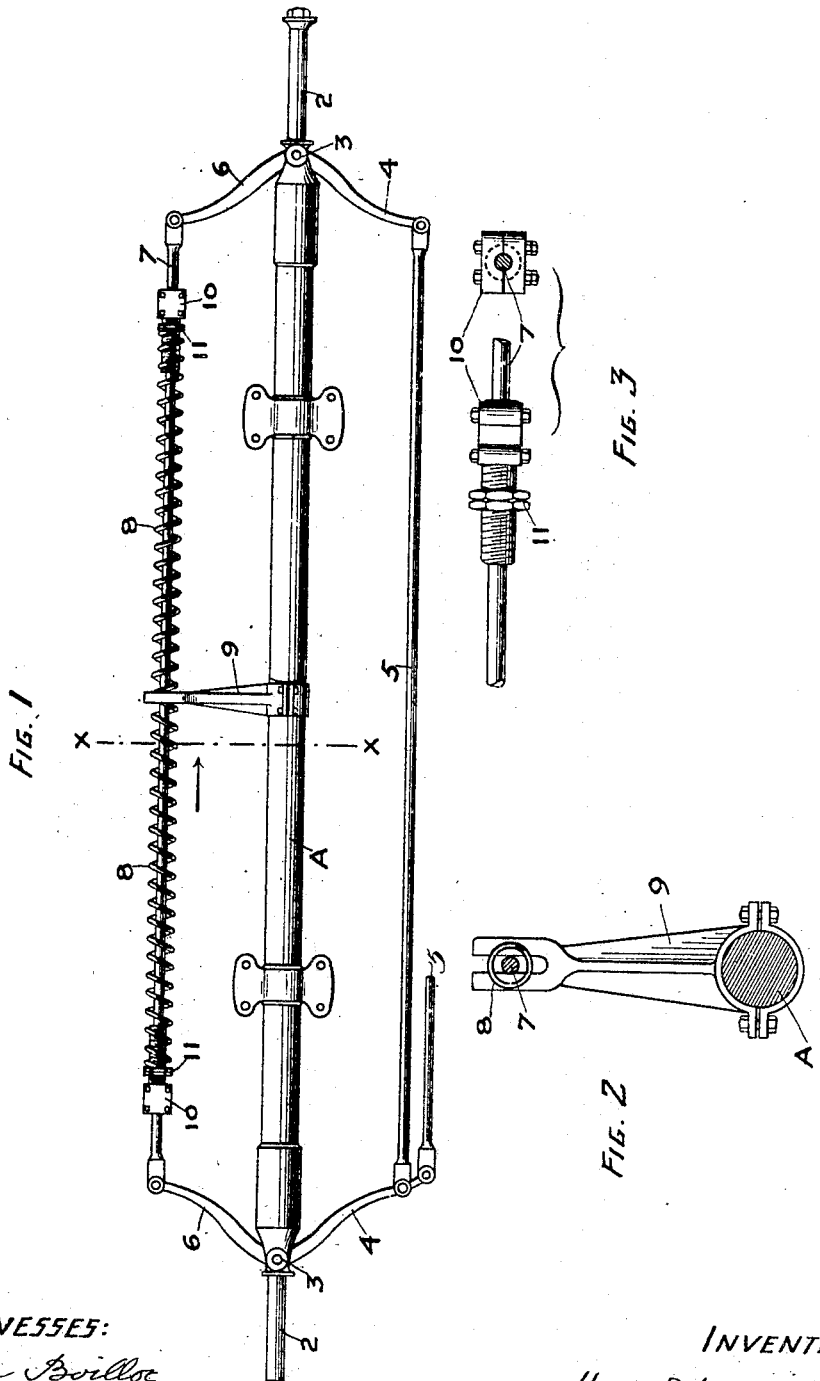
WITNESSES:
Leon Boillot
Charles A. Neufeld
INVENTOR
Henry P. Larouette
by Geo. H. Strong.
Att'y

UNITED STATES PATENT OFFICE.

HENRY P. LAROUETTE, OF SAN JOSE, CALIFORNIA, ASSIGNOR OF ONE-EIGHTH TO GEORGE L. BARKER, ONE-EIGHTH TO ARTHUR L. WOOD, AND ONE-EIGHTH TO ALLEN J. MOAN, ALL OF SAN JOSE, CALIFORNIA.

SAFETY STEERING ATTACHMENT FOR AUTOMOBILES.

No. 929,605.   Specification of Letters Patent.   Patented July 27, 1909.

Application filed July 3, 1908. Serial No. 441,736.

*To all whom it may concern:*

Be it known that I, HENRY P. LAROUETTE, citizen of the United States, residing at San Jose, in the county of Santa Clara and State of California, have invented new and useful Improvements in Safety Steering Attachments for Automobiles, of which the following is a specification.

My invention relates to a safety attachment for the steering mechanism of self-propelled vehicles.

Accidents more or less serious are of frequent occurrence by reason of the steering gear of an automobile breaking or going wrong, leaving the driver of the machine helpless to guide the machine in its course.

The object of my invention is to provide a simple, cheap, practical attachment, which can be applied to any automobile already in use, and which will act on the steering knuckles of the vehicle normally to maintain the wheels in planes parallel with the longitudinal axis of the machine; so that in the event any part of the steering mechanism goes wrong, the wheels will immediately adjust themselves so that the vehicle may travel in a straight line, and will not be upset by being brought to a sudden stop, as now frequently occurs, by the wheels turning under the machine.

The invention consists of the parts and the construction and combination of parts as hereinafter more fully described and claimed, having reference to the accompanying drawing, in which—

Figure 1 is a plan view of the front axle of an automobile, showing one mode of applying the invention. Fig. 2 is a section on X—X, Fig. 1. Fig. 3 is an enlarged detail of the spring regulating device.

A represents the axle of an automobile or other vehicle to which the invention is applicable, and 2 the usual steering knuckles pivoted to the axle at 3 and having the steering arms 4 connected by a rod 5. The simultaneous steering action of the knuckles is effected from the steering wheel through the rod 5 and the usual steering gear, not necessary here to be shown.

Secured to each knuckle 2 is a rigid arm 6, here shown as extending forward of the axle, and these arms 6 are pivotally connected by a rod 7. This rod is surrounded by two coiled springs 8 having their inner ends contiguous to the middle of the rod 7 and abutting against a stop or bracket 9 which is clamped rigidly to the axle A. The end of the bracket 9 is slotted, as shown in Fig. 2, to accommodate the rod 7 and allow for lengthwise play of the rod due to the steering operations.

The outer end of each spring 8 is preferably supported adjustably on the rod 7 by means of adjusting clamps 10. These clamps 10 are preferably split lengthwise and clamped around the rod 7 by four bolts, as shown in Fig. 3. For about half the length of the clamp the same is threaded to receive the adjusting set nuts 11 by which the tension of each spring is regulated, so that normally the springs will coact with the fixed stop member 9 to hold the spindles on the knuckles in alinement, and thereby maintain the course of the vehicle in a straight line parallel with the longitudinal axis of the vehicle.

It is manifest that the opposed tension springs 8 could be applied direct to the rod 5, but the arrangement here shown is preferred, because if rod 5 or either of the steering levers 4 should break, or any of the other rods, pins or bolts connecting the steering wheel and the steering knuckles should become detached, the double opposed springs 8 mounted on the separate rod 7 will automatically cause the front wheels to assume a position tending to lead the automobile in a straight course, and prevent what otherwise might result in the overturning of the vehicle. The double opposed springs 8 by tending to maintain the wheels always in a straight course obviate a constant see-sawing of the steering wheel when the steering gear is more or less worn.

As the springs 8 are necessarily quite stiff in order to perform their functions properly, it is quite important that accidents due to their possible breakage be guarded against as far as possible. Therefore, by placing these springs around, and supporting them on the rod 7, they are maintained on compression with a minimum tendency to crystallization and breakage; and even if one of them should break it would still be supported on the rod, and the movement sidewise of the wheels would not exceed the width of one turn. If it were not for the rod 7 or some equivalent axial support for the springs, the broken spring would drop down and the vehicle would meet with the very accident which it is the design of the invention to prevent.

Having thus described my invention, what I claim and desire to secure by Letters Patent is—

The combination with an axle, the steering knuckles pivoted thereto, the steering arms, and a rod for operating the arms, of other arms rigid with the knuckles, a rod extending between the second-named arms and being independent of the steering-rod, a stop disposed centrally of the second named rod and supported from the axle, double opposed springs on the second rod acting on opposite sides of the stop, and means for adjusting the tension of said springs, said adjusting means comprising split clamps adjustable on the second-named rod, and set-nuts adjustable on the clamps and against which the outer ends of the springs bear.

In testimony whereof I have hereunto set my hand in presence of two subscribing witnesses.

HENRY P. LAROUETTE.

Witnesses:
 GEORGE E. B. WELLES,
 F. B. FILLMORE.